United States Patent [19]

Weiss

[11] 4,165,682
[45] Aug. 28, 1979

[54] SANDWICH GRIDDLE

[75] Inventor: Frank F. Weiss, Etowah, N.C.

[73] Assignee: Mid-Continent Metal Products Co., Chicago, Ill.

[21] Appl. No.: 909,531

[22] Filed: May 25, 1978

[51] Int. Cl.² .................. A47J 37/06; H03B 3/06
[52] U.S. Cl. .................................... 99/331; 219/524
[58] Field of Search .................. 99/331, 332, 340, 357, 99/349, 372, 424, 422, 426, 425; 219/463, 524, 525, 385, 443, 533

[56] References Cited

U.S. PATENT DOCUMENTS

| 2,881,299 | 4/1959 | Jepson | 99/376 X |
| 2,899,888 | 8/1959 | Koci | 219/525 |
| 3,520,249 | 7/1970 | Miller | 99/357 |
| 3,678,844 | 7/1972 | Marshall | 99/340 |
| 3,938,431 | 2/1976 | Potvin | 99/425 |
| 3,998,145 | 12/1976 | Maisch | 99/340 |

*Primary Examiner*—Edward J. McCarthy
*Attorney, Agent, or Firm*—Hill, Van Santen, Steadman, Chiara & Simpson

[57] ABSTRACT

An individually heated top griddle plate for a sandwich griddle which is attachable to standard flat griddles to convert the same to a two-sided sandwich griddle. The top griddle is attachable to a back or side splash wall and has a projecting hinged arm which carries a floating heated griddle plate.

12 Claims, 11 Drawing Figures

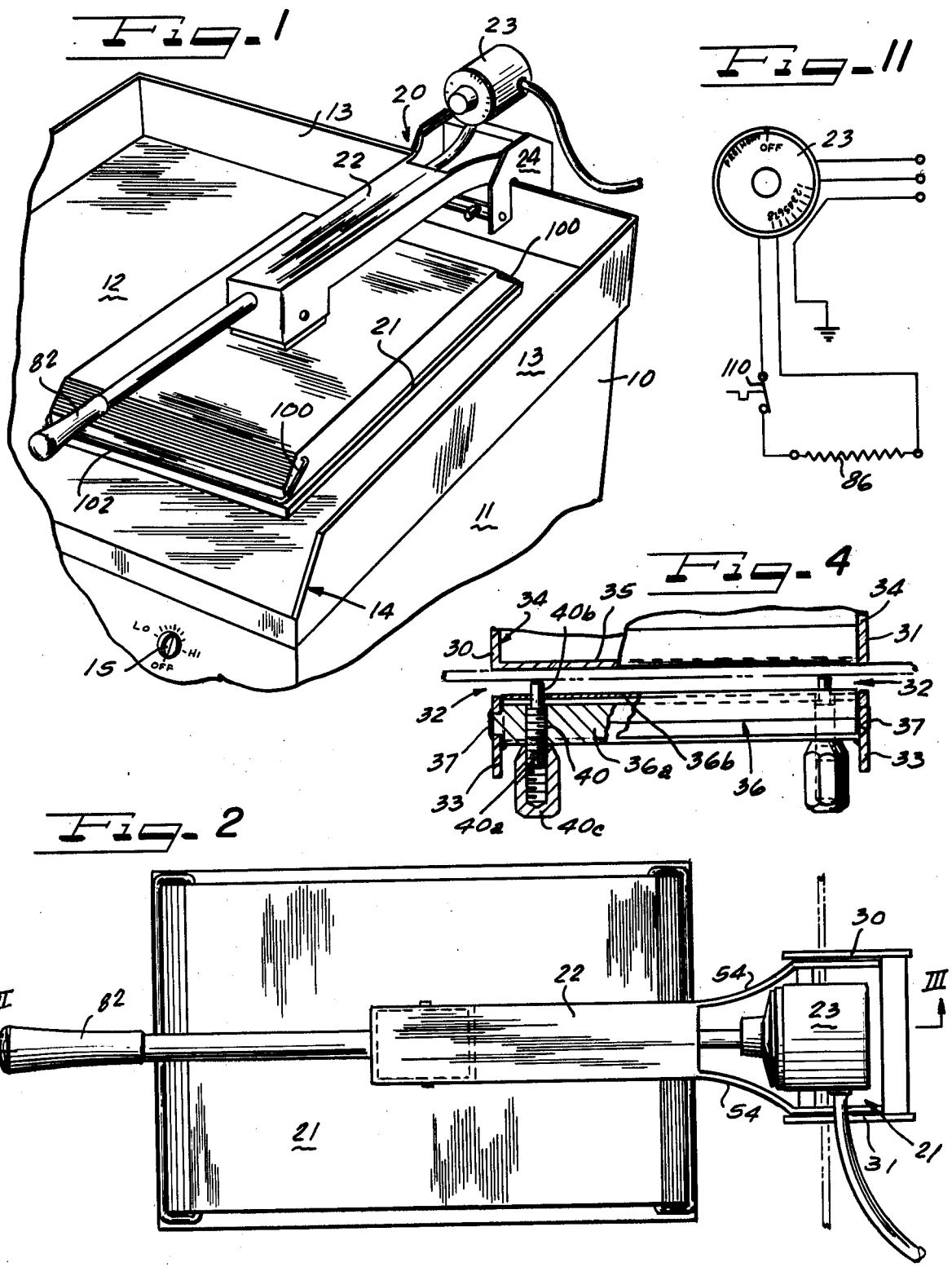

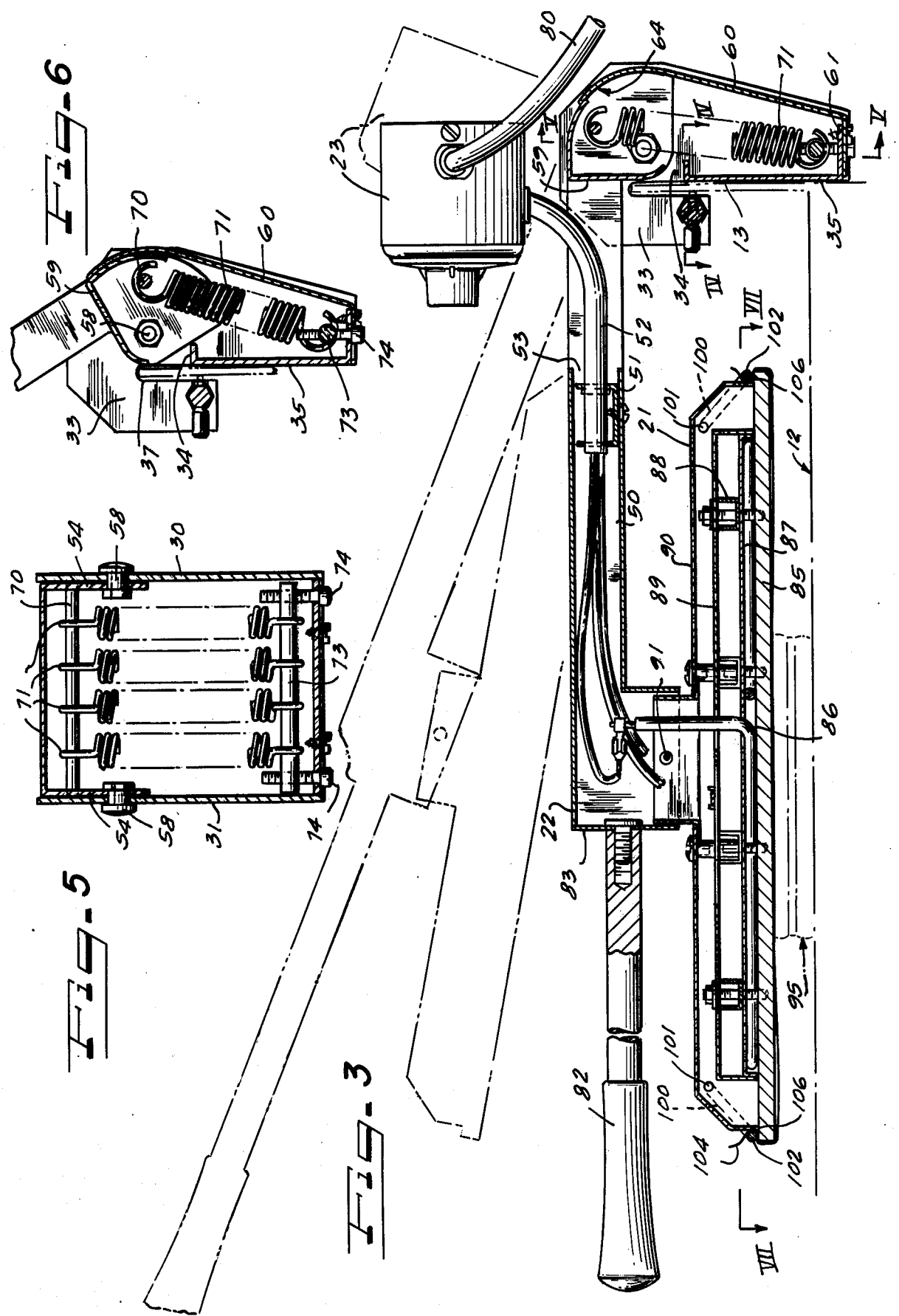

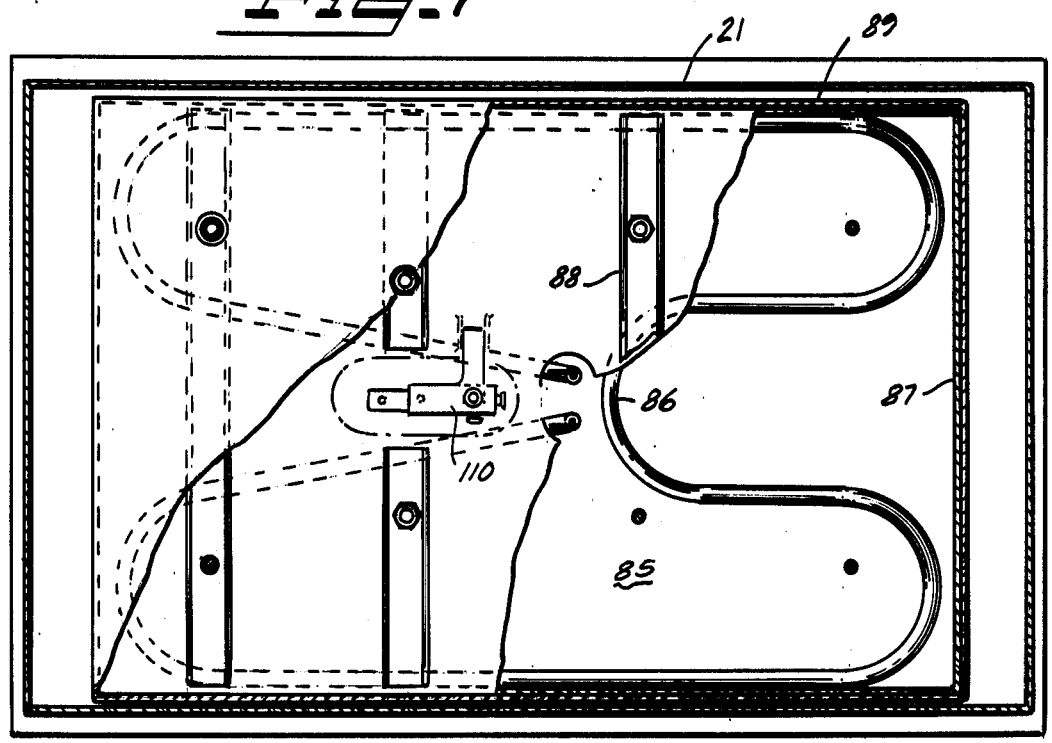
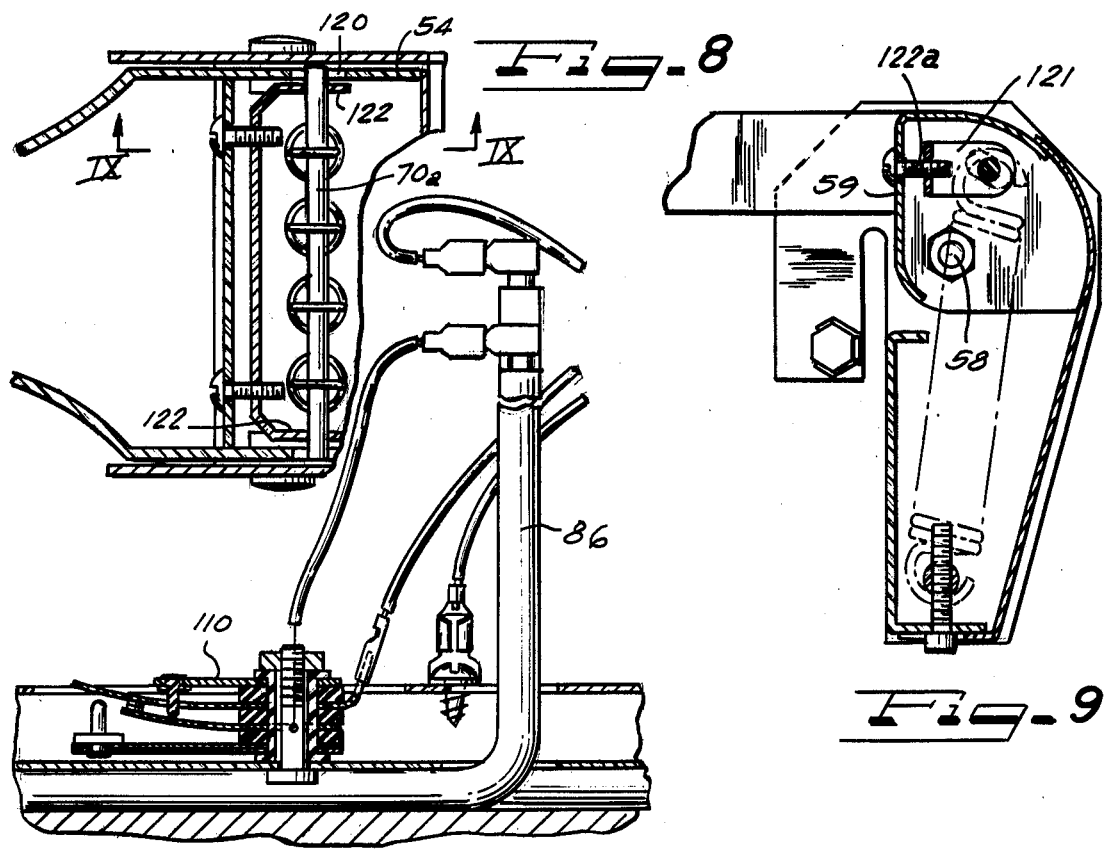

SANDWICH GRIDDLE

BACKGROUND OF THE INVENTION

1. Field of the Invention

This invention relates to cooking utensils and more particularly to a sandwich griddle.

2. Prior Art

Many commercial food service establishments are provided with electric or gas-fired flat griddles which consist generally of a base housing having a flat or ribbed heated top surface surrounded on three sides by a raised splash guard. Such griddles are commonly used in the preparation of many heated and cooked foods. However, such flat or one-sided griddles are not advantageously used for some foods which should be griddled simultaneously on both sides. A prime example are some types of sandwiches which are desired to be heated simultaneously from both sides. Moreover, certain types of food items, including some sandwiches, should be heated on both sides well under some slight pressure. Therefore, it has been common in facilities equipped only with single surface griddles to cook sandwiches and the like while applying a weight to the top side and cooking the bottom side and to thereafter invert the sandwich applying weight to the top side. This not only takes considerable period of time and requires fairly constant monitoring, but it produces, in some instances, a less desirable product.

In order to overcome these deficiencies, it has been known to provide special sandwich griddles or grills which have a hinged heated top plate. While such specific sandwich griddles are desirable from a standpoint of two-sided cooking of sandwiches, they are inefficient in cooking single-sided foods such as eggs and the like, since heat is still applied to the top plate. In addition, since the devices are, for all practical purposes, special use devices usable only for two-sided cooking, they represent a significant limited use investment, particularly on the part of small establishments, which, for the most part, are already equipped with the aforementioned flat griddles.

It would, therefore, be an advance in the art to provide an economical two-sided heating sandwich griddle.

It would be a more beneficial advance in the art to provide an attachment for existing flat griddles capable of converting flat griddles, selectively, to two-sided heated sandwich griddles.

SUMMARY OF THE INVENTION

It is the object of this invention to overcome the disadvantages of the prior art, and to provide the above identified advances in the art.

I have accomplished this by providing a clamp-on unit which is easily affixable to existing flat griddles and which provides a heated top plate converting the flat griddle to a two-sided heated sandwich griddle. My unit includes a clamp member for attaching the unit to a splash guard or wall of the flat griddle, a pivoted arm for projecting from the splash wall over the griddle surface of the flat griddle, a heated top plate pivotally depending from the arm, heating coils for the top plate controlled by a separate thermostat from the flat griddle thermostat, and a spring biased pivot assembly for the arm capable of maintaining the arm in a raised position with the top plate raised clear of the flat griddle, while if desired maintaining the top plate in contact with a sandwich being prepared.

It is therefore an object of this invention to provide an add-on unit for pre-existing flat griddles for conversion of said flat griddles to two-sided cooking sandwich griddles.

It is another and more specific object of this invention to provide an add-on unit for attachment to flat griddles for converting the same to two-sided sandwich griddles, the add-on unit being provided with a clamp means for affixing the unit to a standard flat griddle, a heated top plate having a griddle surface, a separate thermostat for control of said heated top plate, and means for pivoting the top plate from a position where its griddle surface is opposed to the heated surface of the flat griddle to a position raised therefrom, and means to maintain the top plate in the raised position.

It is a general object of this invention to provide an inexpensive unit for conversion of flat griddles to two-sided cooking sandwich griddles.

Other objects and advantages of the present invention will become apparent from a study of the explanation of the drawings, in which:

BRIEF DESCRIPTION OF THE DRAWINGS

FIG. 1 is a fragmentary perspective view of a sandwich griddle according to this invention;

FIG. 2 is a top plan view of the top plate unit of the sandwich griddle of this invention;

FIG. 3 is a side sectional view of the top plate unit taken along the lines III—III of FIG. 2 illustrating the top plate in a partially raised position by broken lines;

FIG. 4 (on page 1 of the drawings) is a fragmentary partially sectional view of the clamp portion of the top plate unit taken along the lines IV—IV of FIG. 3;

FIG. 5 is a sectional view of the spring assembly and hinge pivot taken along the lines V—V of FIG. 3;

FIG. 6 is a fragmentary sectional view of the spring assembly and hinge illustrating that assembly in a top plate raised position;

FIG. 7 is a top sectional view taken along the lines VII—VII of FIG. 3 with portions broken away to show underlying portions;

FIG. 8 is a fragmentary sectional view of an alternative embodiment of the spring assembly and hinge;

FIG. 9 is a sectional view taken along the lines IX—IX of FIG. 8;

FIG. 10 is an enlarged fragmentary view of the heat rod connection and safety thermostat; and FIG. 11 (on page 1 of the drawings) is a schematic view of the electric system of the top plate unit of this invention.

DESCRIPTION OF THE PREFERRED EMBODIMENTS

FIG. 1 illustrates a griddle 10 having a base 11, a heated top plate 12 surrounded on three sides by a raised wall 13 which may function as a grease or splash guard and an open front 14. The heated top plate 12 may be heated by electric, gas, radiant heat or the like and is controlled by one or more separate controls 15. Such griddles are common in commercial kitchens and are used for all manner of food preparation such as frying, grilling, etc.

In order to convert such griddle to a two-sided sandwich griddle, I have provided an independent top plate assembly 20. The assembly 20, in general, consists of a top plate unit 21, a pivoted arm 22 and a heat control 23.

A clamp assembly 24 is designed for attachment of the assembly 20 to the raised wall 13, either at the back of the griddle 10 or at a side thereof.

The clamp assembly, as best illustrated in FIGS. 2, 3 and 6, includes spaced apart side wall members 30 and 31 having downwardly opening slots 32 therein defining front leg 33 and a rear leg portions 34. The rear portions 34 of the side wall members 30 and 31 are interconnected by a bight wall portion 35 whereas the front leg portions 33 are interconnected by a bar assembly 36, best illustrated in FIG. 4. The bar assembly may be affixed to the wall portions 33 by a pin and hole index as illustrated at 37. The bar assembly may include a six-sided bar member 36a and a clamp on mating configuration sheet member 36b. Set screw members 40 project through threaded bores through the member 36a projecting from openings in the member 36b towards the bight wall 35. The set screw members 40 may be equipped with allen wrench openings 40a at one end thereof and smooth surfaced abutting ends 40b at the opposite end. A closed internally threaded cap 40c completes the set screw assembly. The provision of the portion 36b and the cap 40c as well as the smooth surface ends 40b assure that grease will not become build up on any threaded portion thereby providing cleaning simplicity of the clamp assembly.

The set screws 40 are clampable against the upstanding walls 13 of the griddle 10 in the manner illustrated to affix the top plate assembly 20 to the griddle 10.

As best illustrated in FIGS. 2 and 3, the arm 22 is hollow as at 50 having affixed therein a bracket 51 which in turn carries a rigid conduit 52 projecting from an open rear end portion 53. Spaced apart side walls 54 of the arm 22 extend backwardly and outwardly beyond the end 53 and extend, in parallel, between the walls 31 and 32 of the clamp unit where, as best illustrated in FIG. 5, they are pivotably attached to the walls 30 and 31 by means of pivotable connections 58. The clamp unit is provided with a right angle cover portion 59, best illustrated in FIGS. 3 and 6, which is affixed to the arm wall extensions 54 and is movable therewith. A back cover 60 closes the area between the walls 30 and 31 and is affixed to an out-turned bottom portion of the bight wall 35 as at 61. As can be seen, mating curves, shown at 64, between the top 59 and the back wall 60 allow the top to move relative to the back wall during upward pivoting of the arm 22 whereas the front opening between the wall 35 and the front of the top 59 is substantially blocked by the griddle wall 13 to which the unit is attached.

A spring attachment rod 70 extends between the wall portions 54 interior of the spring and clamp unit and has the hook ends of a plurality of coil springs 71 attached thereto. The opposite ends of the springs 71 have hook ends attached to a movable bar 73 which is supported interiorally of the clamp and spring assembly by means of adjustable bolts 74 which project through the out-turned bottom portion of the bight wall 35. In this manner the tension of the springs between the bars 70 and 73 may be adjusted by adjusting the bolts 74.

The positioning of the bar 73 with respect to the pivots 58 is such as to provide a desired tension on the arm 22 to maintain it in a lifted-up position away from the top 12 of the griddle 10 and, if desired, to maintain it in a biased condition towards the top 12 when it has been lowered beyond a given point. It can be seen that by placement of the bar 70 at a proper position vis-a-vis the pivot point 54, the springs can function, either as an over-center spring assembly to force the top plate 21 both in an elevated position and in a depressed position, or the placement can be such that the weight of the unit will be sufficient to overcome the spring resistance so that a slight positive downward weight exists when the top plate is adjacent the surface 12 whereas, when elevated, the springs 71 will be sufficient to maintain the arm 22 and top plate 21 in an elevated position.

A heater control 23 is positioned above the spring and clamp unit and is affixed to an end of the rigid conduit 52 which may be bent as illustrated in FIG. 3. The heater control unit 22 has an electric conduit 80 attached thereto supplying a separate electric circuit to the control 23 from the control 15 of the griddle 10 such that the upper plate 21 may be heated independently of the griddle surface 12.

A projecting handle grip 82 extends from a front end 83 of the arm 22 and is used for raising and lowering the overall arm and top plate assembly.

The top plate unit 21, best illustrated in FIGS. 3 and 7, consists of a flat plate member 85, an electric heating coil 86, which may be a heat-coil type unit, an inner cover 87, U-shaped cross-section spacers 88, an intermediate cover 89 and an outer cover 90. The purpose of the various covers is to make sure that heat is reflected from the coil 86 back to the plate 85, while at the same time preventing entry of grease to the interior of the unit. The top plate unit is hinged to the arm 22 as at 91 so as to be free floating with respect to the arm, at least to the extent that it is pivotable along the longitudinal extent of the arm. This allows the top plate to conform to the level of a sandwich 95 or other food item to be cooked between the plate 85 of the top plate unit and the heated surface 12 of the griddle.

Finally, in order to protect the plate 85, the front and rear of the top plate unit may be provided with free pivoting clamp members 100 which are pivotably attached to the outer cover 90 as at 101 and which have hold-down portions 102 extending across the front and rear of the top plate. Aluminum foil or the like, 104 may be threaded between the top cover 90 and the portions 102 of the clamps and thence over the under surface of the plate 85. It has been found that gravity alone is sufficient to bias the clamps 100 downwardly to trap the foil between a projecting top ledge 106 of the plate 85 to maintain the foil in place. This use of aluminum foil or the like assures that the plate 85 will be maintained clean and will therefore not be subject to scratching during a cleaning process.

As best illustrated in the schematic of FIG. 11 and in FIG. 10, the heating coil 86 is controlled by a power source from the heat control 23 which is connected in series through a thermostat switch 110 so as to break the connection to the heat units 86 in the event of any excessive overheating condition. The thermostatic switch 110 is preferably of a type which will self-close after it has cooled down.

The heat control 23 may, if desired, be a thermostat unit and may therefore be equipped with a thermostat sensor. Alternatively, I have found that an intermittent time control works adequately. Particularly, I have found that a infinite switch manufactured by Robert Shaw and sold under the code number INF-120-575 works adequately in connected with a 15 amp 120 volt AC heat coil assembly.

FIGS. 8 and 9 illustrate a modification of the spring assembly unit where the rod 70a, otherwise equivalent to the rod 70, is received freely in elongated slots 120 in the side walls 54. A yoke member 121 has side arms 122 with apertures therein snugly receiving the bar 70a. The yoke member is positionable interiorally of the spring unit as by means such as bolts 122a projecting through the wall 59. In this manner, the spring rod 70a may be moved with respect to the pivot point 58 of the arm by adjustment of the bolts 122a. This, in effect, provides for a dual adjustment of the spring. Adjustment of the bolts 74 allows for compensation of variations in springs and tolerance built-p in part so as to maintain the arm in a raised position. Adjustment of the upper arm 70a through adjustment of the bolts 122a allows for compensation of the effective weight of the top plate unit on food being cooked which may occur due to variations in elevation between the griddle surface 12 and the height of mounting of the unit on the splash walls 13. It also allows for an optimum setting for operator preference by means of changing the lever ratio of the fixed length of the arm to the variable length of the spring force arm.

It can therefore be seen from the above that my invention provides a novel, inexpensive conversion assembly for converting a flat griddle to a two-sided cooking sandwich griddle. The unit consists of a clamp assembly for clamping the unit the splash wall of griddle, a projecting arm having a depending floating top plate affixed thereto, a hinge and spring assembly for allowing the arm to be raised and lowered with respect to the clamp unit, an individual heat control for the top plate, and an adjustable spring force for biasing the arm in either a raised position or raised and lowered positions.

It will be apparent to those skilled in the art that many modifications and variations may be effected without departing from the spirit and scope of the novel concepts of the present invention.

I claim as my invention:

1. A sandwich griddle assembly for converting flat griddles to two-sided cooking sandwich griddles comprising a clamp device for clamping the assembly to a splash wall of a flat griddle, an arm projecting from the clamp device and pivotable with respect thereto, a top plate assembly depending from the arm and pivotable with respect thereto, a heatable plate affixed to an underside of the top plate assembly, a heat means in the top plate assembly for heating said heatable plate, a heat control for controlling said heat means, a power supply to said heat control independent of the flat griddle, the arm pivotable between a raised and a lowered position with respect to the flat griddle when the clamp device is affixed to the splash wall of the flat griddle, and spring means biasing the arm in at least one of a raised and lowered position.

2. The assembly of claim 1 wherein the spring means includes a plurality of coil springs tensioned between first and second bars, said first bar being affixed to the clamp unit, said second bar being affixed to said arm adjacent a pivot connection between said arm and said clamp unit, said first and second bars moving with respect to one another during raising and lowering of the arm with respect to the clamp.

3. The device of claim 2 wherein the first bar is adjustably movable to adjust tension on the springs.

4. The device of claim 3 wherein the second arm is adjustably movable with respect to the pivot point.

5. The device of claim 3 wherein the clamp device consists of spaced apart wall members having upwardly opening slots, a bight wall between said wall members at a rear face of the slots, a clamp bar between said wall members at a front face of the slots, set screws through said clamp bar movable towards and away from said bight wall to enclamp a splash wall between said set screws and said bight wall.

6. The device of claim 5 wherein the arm has side wall portions projecting between the clamp side walls and pivotably affixed thereto.

7. The device of claim 6 wherein the heat control is affixed to said arm and is mounted above said clamp device.

8. A sandwich griddle conversion unit for attachment to flat griddles comprising a clamp unit clampable to a splash wall of the flat griddle, a projecting arm pivotably connected to the clamp unit, a heated top plate assembly depending from the arm, a heat source in said heated top plate assembly for heating at least a portion of said heated top plate assembly, a control unit for said heat source, a power supply to said control unit for controlling said heat source through said control unit, and biasing means maintaining said arm and top plate assembly in a raised position with respect to a flat griddle to which the conversion unit is affixed, said arm being movable from said raised position to a lowered position with the top plate assembly portion in opposition to a heatable surface of the flat griddle.

9. The device of claim 8 wherein the top plate assembly comprises a heatable plate, an electric heat unit carried on a top surface of said plate, a reflector cover over said heat unit and a top cover over said reflector cover, said top cover being pivotably attached to the arm whereby the top plate assembly is pivotable about an axis extending in a plane normal to a longitudinal direction of the arm.

10. The device of claim 9 including means for affixing a foil cover over a bottom surface of the heatable plate.

11. The device of claim 10 wherein the means for affixing the foil comprises clamps at a front and a rear of the top plate assembly.

12. The device of claim 11 wherein the clamps comprise pivotable members affixed to the top cover having foil engaging lengths urged by gravity downwardly and inwardly into engagement with other portions of the top plate assembly and pivotable upwardly and outwardly away therefrom to allow insertion of a foil between the portions.

* * * * *